United States Patent
Kryzhanovsky et al.

(10) Patent No.: US 11,579,866 B2
(45) Date of Patent: *Feb. 14, 2023

(54) DEVELOPER COLLABORATION CONTROL SYSTEM

(71) Applicant: Roblox Corporation, San Mateo, CA (US)

(72) Inventors: Michael Kryzhanovsky, San Ramon, CA (US); Tyler Berg, Redwood City, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,089

(22) Filed: Oct. 5, 2020

(65) Prior Publication Data
US 2021/0019144 A1 Jan. 21, 2021

Related U.S. Application Data

(63) Continuation of application No. 16/228,415, filed on Dec. 20, 2018, now Pat. No. 10,795,670.

(51) Int. Cl.
*G06F 9/44* (2018.01)
*G06F 8/71* (2018.01)
*G06F 8/30* (2018.01)

(52) U.S. Cl.
CPC . *G06F 8/71* (2013.01); *G06F 8/30* (2013.01)

(58) Field of Classification Search
CPC ..................................... G06F 8/30; G06F 8/71

(Continued)

(56) References Cited

U.S. PATENT DOCUMENTS 8,683,430 B2 3/2014 Gonzales et al.
8,843,832 B2 * 9/2014 Frields ............... G06F 9/542
715/756

(Continued)

FOREIGN PATENT DOCUMENTS

CN 104820585 A 8/2015

OTHER PUBLICATIONS

Goldman, "Software Development with Real-Time Collaborative Editing", 2012, Department of Electrical Engineering and Computer Science, MIT, 133 pages. (Year: 2012).*

(Continued)

*Primary Examiner* — Ted T. Vo
(74) *Attorney, Agent, or Firm* — Lowenstein Sandler LLP

(57) ABSTRACT

A method includes providing, to a first client device, a presentation of a first instance of source code. The method further includes receiving, by a server device from the first client device, a selection of a first presentation type from a plurality of presentation types comprising the first presentation type and a second presentation type. The first presentation type specifies first access privileges to first source code changes made by a first user associated with the first client device to the first instance of the source code. The second presentation type specifies second access privileges that are different from the first access privileges of the first presentation type. The method further includes providing, to a second client device, a presentation of a second instance of the source code with the first source code changes in accordance with the first presentation type.

20 Claims, 6 Drawing Sheets

(58) Field of Classification Search
USPC .................................. 717/110–113, 168–173
See application file for complete search history.

(56) References Cited

U.S. PATENT DOCUMENTS

| | | | |
|---|---|---|---|
| 9,158,518 B2* | 10/2015 | Brown | G06F 8/47 |
| 9,483,259 B1 | 11/2016 | Lee et al. | |
| 9,667,676 B1* | 5/2017 | Lo | G06F 40/166 |
| 10,089,056 B2* | 10/2018 | Thimbleby | G06Q 10/06 |
| 10,242,430 B2 | 3/2019 | Red | |
| 10,657,474 B2* | 5/2020 | Moolman | G06F 8/38 |
| 10,795,670 B2* | 10/2020 | Kryzhanovsky | G06F 8/30 |
| 2010/0257457 A1 | 10/2010 | De Goes | |
| 2012/0233555 A1 | 9/2012 | Psistakis et al. | |
| 2012/0278790 A1 | 11/2012 | Bates | |
| 2014/0258969 A1 | 9/2014 | Brown et al. | |
| 2015/0199318 A1 | 7/2015 | Lemonik et al. | |
| 2015/0215390 A1 | 7/2015 | Yerli | |
| 2017/0235568 A1 | 8/2017 | Cowan et al. | |
| 2018/0107445 A1 | 4/2018 | Ohmura | |
| 2018/0124134 A1 | 5/2018 | Hyodo et al. | |

OTHER PUBLICATIONS

Cherif et al., "Optimistic Access Control for Distributed Collaborative Editors", 2011, ACM, pp. 861-868 (Year: 2011).*

IP.com, "Deployable Development Environments using Paas and Micro-Clouds", 2015, IP.com Prior Art Database technical Disclosure, 6 pages (Year 2015).

Tani Tudorache "Collaborative Protégé", 2011, ProtégéWiki, 13 pages (Year 2011).

What is Visual Studio Live Share? https://docs.microsoft.com/en-us/visualstudio/liveshare/ retrieved Dec. 20, 2018.

How-to: Collaborate using Visual Studio Code https://docs.microsoft.com/en-us/visualstudio/liveshare/use/vscode, retrieved Dec. 20, 2018.

Amanda Silver, "Introducing Visual Studio Live Share" Nov. 15, 2018, https://code.visualstudio.com/blogs/2017/11/15/live-share, retrieved Dec. 20, 2018.

How-to: Collaborate using Visual Studio https://docs.microsoft.com/en-us/visualstudio/liveshare/use/vs, retrieved Dec. 20, 2018.

International Search Report and Written Opinion dated Apr. 21, 2020, on application No. PCT2019/066636.

Debreceni, et al. "Enforcing fine-grained access control for secure collaborative modelling using bidirectional transformations." Springer Link (https://link.springer.com/article/10.1007/s10270-017-0631-8), Nov. 21, 2017, 33 pages.

Supplementary Search Report issued by the European Patent Office for EP Application No. 19900269.2, dated Dec. 22, 2021.

How-to: Collaborate using Visual Studio, Apr. 24, 2018, 23 pages.

Silver, Amanda, "Introducing Visual Studio Live Share." Nov. 15, 2017, 5 pages.

How-to: Collaborate using Visual Studio Code, Apr. 26, 2018, 31 pages.

Tudorache, Tania, "Collaborative Protégé". Feb. 13, 2009, 13 pages.

IP.com Deployable Development Enviroments using PaaS and Micro-Clouds, Oct. 16, 2015, 6 pages.

* cited by examiner

Record of Changes 119A

Copy 109A of Committed Version 107 of Source Code 140

Line 10: add text "abc"

Line 15: remove text "def"

Between line 17 and 18: add new line with text "ghi"

FIG. 1B

DEVELOPER COLLABORATION CONTROL SYSTEM

RELATED APPLICATION

This application is a continuation application of U.S. patent application Ser. No. 16/228,415, filed Dec. 20, 2018, the entire contents of which are hereby incorporated by reference herein.

TECHNICAL FIELD

This disclosure relates to the field of source code control systems and, in particular, collaborative editing of source code.

BACKGROUND

Source code is program instructions designed to perform a group of coordinated functions, tasks, or activities. Source code may be edited by a user (e.g., a developer). One or more users may collaborate to edit source code.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1B illustrates an example of a record of changes, in accordance with implementations of the disclosure.

DETAILED DESCRIPTION

Figure 1A:
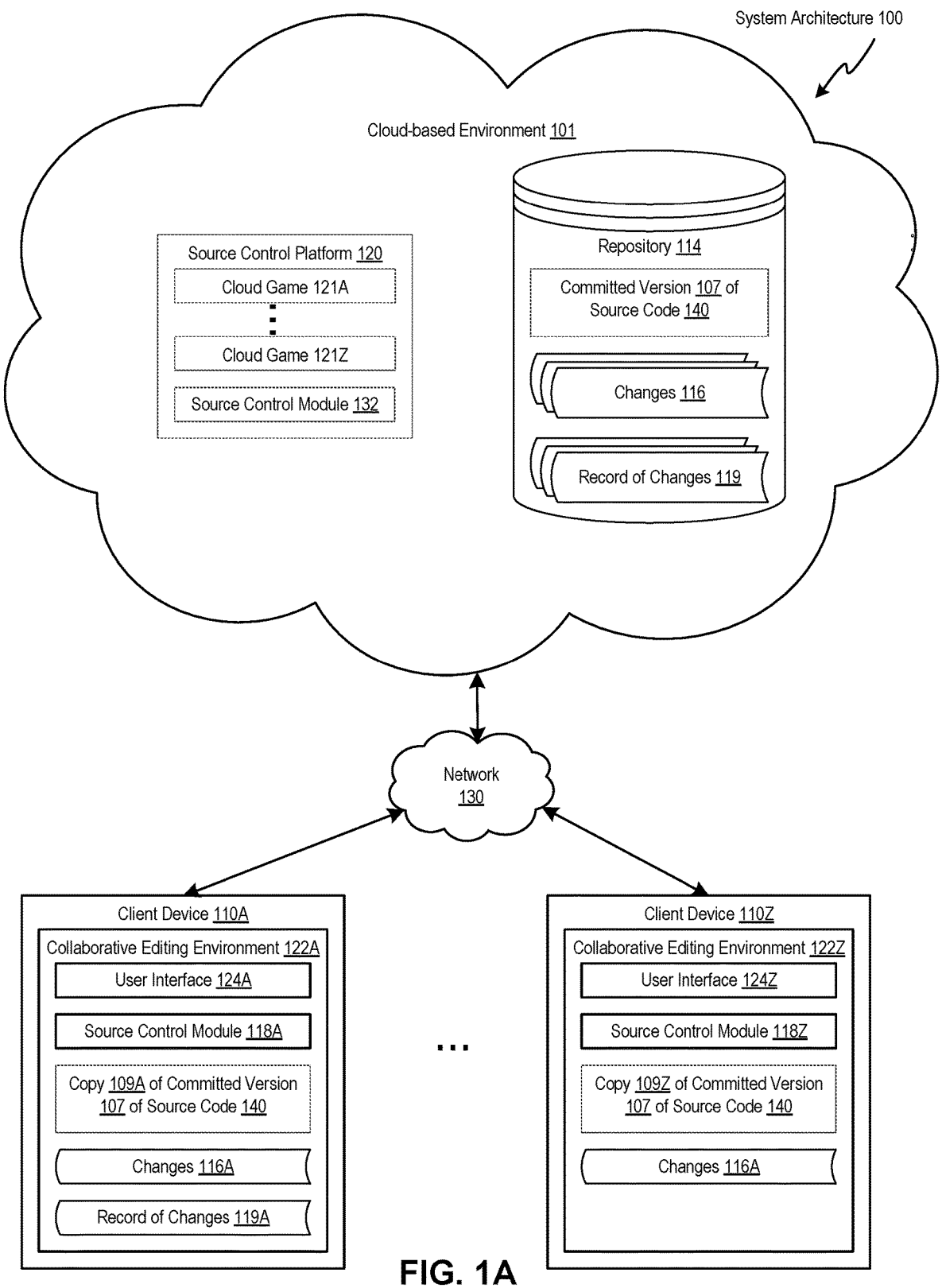
FIG. 1A illustrates an example of a system architecture, in accordance with implementations of the disclosure.

Source code is a text version of program instructions that are written in a programming language that a user can read and change. A large program may include many pieces of source code (e.g., source code files) that work together. Source code may be prepared for execution by translating (e.g., compiling, interpreting) the code into language (e.g., assembly language, machine language) that is faster and easier for a computer to read. Source code may be edited by multiple users. As multiple users provide changes to the source code, the changes are to be synchronized and conflicts are to be resolved. Synchronizing changes and merging conflicts increases processor overhead, required bandwidth, and energy consumption.

In some systems, multiple developers can edit or modify source code independently. A developer may download a piece of source code and work on the piece of source code. Another developer can download the same piece of source code and work on the same piece of source code. Both developers may not have knowledge of the changes the other developer is making to the source code. When the developer attempts to merge changes to the source code with a production version of the source code, the changes may conflict with other changes to the source code that were previously merged with the production version of the source code by the other developer. For example, a first user (e.g., first developer) may delete lines 1-10 of source code and a second user (e.g., second developer) may make edits (e.g., add text without deleting) to lines 5-8 of the source code. The system cannot delete lines 1-10 and make edits to lines 5-8, therefore the changes conflict and cannot be merged.

In some systems, changes by multiple users may not be compatible. For example, a first user makes first changes lines 1-10 of the source code and a second user makes second changes to lines 11-20 of the source code. The first changes and the second changes may not be compatible with each other. In response to the system merging the first and second changes, the source code may not operate properly.

In some systems, a first user may be making substantial changes to the source code (e.g., making changes that will affect a substantial portion of the source code), so changes made by other users while the first user is making substantial changes may need to be altered or modified after the substantial edits are merged into the source code. In response to the system merging the substantial changes and the other changes by the other users, the source code may not execute properly until the other users make additional changes.

Aspects of the disclosure address the above-mentioned and other challenges by providing a collaborative editing environment for a source code control system. In some embodiments, the collaborative editing environment can allow for multiple users to edit and modify source code in real-time. In some embodiments, the collaborative editing environment can allow users to specify how their respective changes to the source code are viewed by other user, how their respective changes can be edited by other users, and whether their respective changes to the source code can be used for compilation or interpretation by other users of the source code control system.

In some embodiments, a cloud-based environment may include a server device and a repository that stores a committed version of source code. Client devices may be communicably coupled to the cloud-based environment via a network. The server device may transmit a corresponding copy of the committed version of the source code to each of the client devices. A first client device associated with a first user may receive user input of changes and may create a first record of changes associated with the first user. A record of changes may include an indication of the user or client device that performed the changes and an indication of the changes (e.g., added text, removed text, added lines, removed lines, etc.). The server device may receive the changes from the first client device and may create a second record of changes associated with the first user. The second record of changes can be stored at the repository. The server device may receive, from the first client device, a selected presentation type specifying access privileges (e.g., viewing, editing, etc.) for the changes or a selected publication type specifying execution privileges (e.g., propagating, interpreting, compiling) for the changes. The server device may transmit, to the other client devices, the changes and instructions for real-time presentation of the changes in accordance with the selected presentation type, and instructions specifying the execution privileges in accordance with the selected publication type.

In some embodiments, the server device may receive, from the first client device, a commit request identifying at least a subset of the changes in the first record of changes. The server device may commit the identified changes to generate a new committed version of the source code and may transmit a corresponding copy of the new committed version to each of the client devices for the real-time collaborative editing of the source code.

By providing a collaborative editing environment for a source code control system, source code conflicts can be reduced or avoided. For example, merging conflicts may be reduced or eliminated (e.g., a user may not add text to lines 5-8 responsive to seeing that another user is editing lines 1-10), changes may be compatible (e.g., a second user may make changes to lines 11-20 that are compatible with a first user's changes to lines 1-10), and users may wait until substantial changes by others have been completed before making further changes. By reducing or eliminating source code conflicts makes source code control systems more efficient and reduces the computational resources (e.g., computer processing resources), required bandwidth, and power consumption of source control systems.

As noted, a technical problem addressed by aspects of the disclosure is that large amounts of network bandwidth, computational resources, and energy are consumed by synchronizing changes and merging or resolving conflicts. If the amount of conflicts are reduced the associated resources are also reduced.

As also noted, another technical problem addressed by aspects of the disclosure is the lack of proper functionality of source code that has been edited by multiple users. For example, changes by one user may not be compatible with changes by another user. Updating the source code to make changes by different users compatible with each other wastes computational resources, network bandwidth, and power.

A technical solution to the above identified technical problems may include providing a collaborative editing environment for a source code control system. The source code control system can transmit a corresponding copy of the committed version of source code to each client device, receive changes and a selection of a presentation type from a first client device, transmit the changes and instructions for real-time presentation of the changes in accordance with the selected presentation type to other client devices, and store the changes in a record of changes that is associated with the first client device. The technical solution may further include receiving a commit request identifying at least some of the source code changes from the record of changes from the first client device, committing the identified changes to generate a new committed version of the source code, and transmitting a corresponding copy of the new committed version of the source code to each client device.

Thus, the technical effect may include reducing the overall bandwidth usage and computational resource usage for collaborative editing of source code. Additionally, the present disclosure may also reduce the overall time it takes to generate a functional, collaboratively edited source code. There is also the further effect of reduced power consumption. Further technical effects may include improving functionality of source code control system. Improving the functionality of such source code may again contribute to more efficient use of bandwidth and computer processing resources.

FIG. 1 is an example of a system architecture 100, in accordance with implementations of the disclosure. The system architecture 100 includes a cloud-based environment 101 connected to client devices 110A-110Z (generally referred to as "client device(s) 110" herein) via a network 130. Although the system architecture 100 is described in the context of a cloud-based environment 101, which may enable communication between source control platform 120 in the cloud-based environment 101 and with client devices 110A-110Z over the network 130 for real-time collaborative editing of source code (e.g., on a source control platform 120), it can be understood that the implementations described herein may also apply to systems that are locally interconnected. In implementations, the cloud-based environment 101 refers to a collection of physical machines that host applications (e.g., source control module 118, cloud games 121A-Z, etc.) providing one or more services (e.g., real-time collaborative editing of source code, editing of games, execution of games, collaboration for games, etc.) to multiple client devices 110A-110Z via the network 130. The physical machines (e.g., source control platform 120) of the cloud-based environment 101 may be geographically distributed to mitigate latency problems and to make co-editing for developers located in different geographic locations possible.

The network 130 may be a public network (e.g., the Internet), a private network (e.g., a local area network (LAN) or wide area network (WAN)), or a combination thereof. Network 130 may include a wireless infrastructure, which may be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 may include a wired infrastructure (e.g., Ethernet).

The cloud-based environment 101 may include source control platform 120 or a repository 114 (e.g., data store). The source control platform 120 may be separate from repository 114 and communicatively coupled to the repository 114. In some implementations, repository 114 may be part of source control platform 120.

In implementations, repository 114 may store a committed version 107 of source code 140, changes 116, or records of changes 119. Contents of the repository 114 may further be described in the subsequent Figures.

In implementations, repository 114 may store a committed version 107 of source code 140 that may include content (e.g., functions, statements, text, etc.). In one implementation, the committed version 107 of source code 140 may be any suitable source code including content that is uploaded to the cloud-based environment 101 by the client devices 110A-110Z or from a server within or outside of the cloud-based environment 101. In an implementation, copies 109 of the committed version 107 of source code 140 may be transmitted to users for real-time collaborative editing by the users. In implementations, the term "real-time collaborative editing of source code" may refer to users modifying (e.g., adding, deleting, changing, etc.) content (e.g., text, functions, statements, data, etc.) in their copy 109 of the committed version 107 of the source code 140, concurrently accessing changes 116 made to one or more copies 109 of the committed version 107 of the source code 140 made by other users, concurrently preparing for execution (e.g., translating, interpreting, compiling, etc.) changes 116 made to one or more copies 109 of the committed version 107 of the source code 140 made by other users, concurrently executing one or more changes 116 made by other users, and the like.

In implementations, changes 116 to copies 109 of committed version 107 of source code 140 by other users may be accessed, prepared for execution, or executed by client devices 110A-Z in real-time. In implementations, real-time may refer to the transmission, presentation, or display of changes to a copy 109 of the committed version 107 of source code 140 to one or more client devices 110 as the changes are being made on different client devices. For example, real-time changes 116A (e.g., edits) to a copy 109A of the committed version 107 of source code 140 may be displayed on a display of a client device 110B (e.g., applied to the copy 109B of the committed version 107) substantially concurrent with a user editing (e.g., making changes 116A) the copy 109A of the committed version 107 of source code 140 using client device 110A (at least within implementation limitations or the technical limitations of displaying real-time changes) For example, the user edits to the copy 109 of the committed version 107 of source code 140 may be displayed within milliseconds of user input and may appear to the receiving user as if in absolute real-time. In another example, the changes at the client device 110A may be sent as a batch of changes that are sent periodically (e.g., every second, etc.). The user edits to the copy 109 of the committed version 107 of source code 140 may be displayed within seconds of user input and may appear to receiving user as if in real-time.

In implementations, the committed version 107 of source code 140 may be source code for a cloud game 121, source code for an application, or any suitable source code (e.g., source code including content such as text, functions, statements, software programming code, lists, etc.) that can be collaboratively edited.

The committed version 107 of source code 140 may be created by an author and the author may store the committed version 107 of source code 140 in the repository 114 for collaborative editing by users (e.g., collaborators). Storing the committed version 107 of source code 140 in the repository 114 for collaborative editing by users may refer to granting permission to the other users to access (view and/or edit), prepare for execution (e.g., compile and/or interpret), or execute a copy 109 of the committed version 107 of source code 140 and changes 116 to the copy 109. Storing the committed version 107 of source code 140 in the repository 114 for collaborative editing by users may include informing the other users of the committed version 107 of source code 140 via a message (e.g., email, text message, etc.) including a link to the committed version 107 of source code 140. The level of permissions that each user is granted may be based on the user type of each particular user. For example, a user with an editor user type may be able to receive a copy 109 of the committed version 107 of source code 140, make changes 116 directly to the copy 109 of the committed version 107 of source code 140, and commit at least a portion of the changes 116 to the committed version 107 of source code 140. As such, numerous collaborators may make changes to the content presented in the committed version 107 of source code 140.

In implementations, cloud-based environment 101 may include a source control platform 120. In some implementations, the source control platform 120 may include a processing device or devices, such as a computer, microprocessor, logic device or other device or processor that is configured with hardware, firmware, or software to carry out some of the operations described herein. Source control platform 120 may include a source control module 118. The source control module 118 may host source code 140 that may be collaboratively edited. For example, the source control module 118 may host source code 140 for cloud games 121A-Z that may be collaboratively edited. The source control module 118 may determine which source code may be edited, which users may edit the source code, what types of edits may be made to the source code, etc. In some implementations the source code 140 includes source code files.

The source control platform 120 may host cloud assets (e.g., source code 140) used in one or more applications (e.g., cloud games 121). In some implementations, the source control module 118 may manage permissions for collaborative editing of the one or more applications. In some implementations, the source control module 118 may manage permissions for collaboratively editing an individual asset.

The source control platform 120 may be physical machines (e.g., server machines, desktop computers, etc.) that each include one or more processing devices communicatively coupled to memory devices and input/output (I/O) devices. The processing devices may include a computer, microprocessor, logic device or other device or processor that is configured with hardware, firmware, and software to carry out some of the implementations described herein. The source control platform 120 may host a source control module 132. The source control module 132 may be implemented as computer instructions that are executable by one or more processing devices on source control platform 120. The source control module 132 may perform the operations described with respect to the following Figures.

In implementations, source control platform 120 may provide a collaborative editing environment 122A-122Z (generally referred to as "collaborative editing environment(s) 122" herein) to the client devices 110A-110Z. The source control platform 120 may include one or more servers and the server selected (from the one or more servers of the source control platform 120) to provide the collaborative editing environment 122A-122Z may be based on certain load-balancing techniques, service level agreements, performance indicators, or the like. The collaborative editing environment 122A-122Z may provide a user interface 124A-124Z that displays a copy 109 of the committed version 107 of source code 140. The collaborative editing environment 122A-122Z may enable users using different client devices 110A-110Z to concurrently access a corresponding copy 109 of the committed version 107 of source code 140 to access, review, edit, view, make changes 116 to, prepare for execution (e.g., compile, interpret), and/or execute the corresponding copy 109 of the committed version 107 of source code 140 in a respective user interface 124A-124Z.

In an implementation, the user interfaces 124A-124Z may be web pages rendered by a web browser and displayed on the client device 110A-110Z in a web browser window. In another implementation, the user interfaces 124A-124Z may be included in a stand-alone application downloaded to the client device 110A-110Z and natively running on the client devices 110A-110Z (also referred to as a "native application" or "native client application" herein).

The client devices 110A-110Z may include one or more processing devices communicatively coupled to memory devices and I/O devices. The client devices 110A-110Z may be desktop computers, laptop computers, tablet computers, mobile phones (e.g., smartphones), or any suitable computing device. The client device 110A-110Z may include components, such as an input device and an output device. A user may be authenticated by source control platform 120 using a username and password (or other identification information) provided by a user via the user interface 124A-124Z, such that the same client device 110A-110Z may be used by different users at different times.

As discussed above, the client devices 110A-110Z may each include a web browser or a native client application. A user that is invited and becomes a collaborator of the committed version 107 of source code 140 may request access to a corresponding copy 109 of the committed version 107 of source code 140 via the web browser or the native client application. For example, the user may select the committed version 107 of source code 140 from the user interface 124 provided by the cloud-based environment 101 and presented by the web browser or the native client application. As such, the client device 110 associated with the user may request a copy 109 of the committed version 107 of source code 140 from the cloud-based environment 101. The collaborative editing environment 122A-122Z may enable a user to view and/or manage a corresponding copy 109 of the committed version 107 of source code 140, with which the user is associated, within a respective user interface 124A-124Z.

The collaborative editing environment 122A-122Z may also enable users using different client devices 110A-110Z to simultaneously access a corresponding copy 109 of the committed version 107 of source code 140 to access, edit (e.g., make changes 116), prepare for execution (e.g., interpret, compile, etc.), or execute the corresponding copy 109 of the committed version 107 of source code 140 in a respective user interface 124A-124Z that presents the copy 109 of the committed version 107 of source code 140.

In some implementations, the source control module 118A-118Z may be a part of client device 110A-110Z. For example, in some implementations, the client device 110A-110Z may have a locally installed application including the source control module 118A-118Z for real-time collaborative editing of source code 140 associated with user. In some implementations, one or more of committed version 107 of source code 140, changes 116, or records of changes 119 may be stored local to client devices 110A-110Z. In some implementations, client devices 110A-110Z may wholly execute source control modules 118A-118Z for real-time collaborative editing of an electronic document, such as the committed version 107 of source code 140. It may be noted that source control modules 118A-118Z of client devices 110A-110Z may be the same or similar to source control module 132 of source control platform 120.

In some implementations, cloud-based environment 101 may wholly execute source control module 132 for collaborative editing of source code 140. In other implementations, operations of source control modules 132 and 118A-118Z may be divided among source control platform 120 and client devices 110A-110Z.

In some implementations, source control modules 118A-118Z of client devices 110A-110Z may be applied to source code 140 stored locally on a client device, such as source code executed and manipulated by using an application running on the user computer.

One or more of client devices 110A-Z may receive changes 116 via a corresponding user interface 124. The changes 116 may be a sequence of operations. An atomic element of changes 116 may be contiguous sequence of operations applied to the copy 109 of committed version 107 by the client device 110. In some implementations, the changes 116 may form a change list. The source control module 118 of client device 110 may periodically transmit changes 116 to the cloud-based environment 101 (e.g., source control platform 120). As the cloud-based environment 101 contiguously receives changes 116A from a client device 110A, the cloud-based environment 101 may contiguously transmit the changes 116A to the other client devices 110B-Z. Each of the client devices 110B-Z may apply (e.g., propagate) the changes 116A to the corresponding copy 109 of the committed version 107 of the source code 140 via operational transforms (e.g., the source control module 118 at the client devices 110 may have operational transform logic). Upon receiving a commit request, the cloud-based environment 101 (e.g., source control module 132) may apply (e.g., commit) the changes 116A to the committed version 107 of the source code 140 at the repository 114 via operational transforms (e.g., the source control module 132 may have operational transform logic).

In situations in which the systems discussed here collect personal information about users, or may make use of personal information, the users may be provided with an opportunity to control whether the cloud-based environment 101 collects user information. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the cloud-based environment 101.

FIG. 1B illustrates an example of a record of changes 119, in accordance with implementations of the disclosure. A collaborative editing environment 122A (e.g., source control module 118A) of a client device 110A may receive a copy 109A of the committed version 107 of source code 140 from the cloud-based environment 101 (e.g., from source control module 132, etc.). The collaborative editing environment 122A (e.g., source control module 118A) of client device 110A may cause at least a portion of the copy 109A to be displayed via user interface 124A. The collaborative editing environment 122A (e.g., source control module 118A) may receive changes 116A to a part of the source code 140 of the copy 109A of the committed version 107 via the user interface 124A. The collaborative editing environment 122A (e.g., source control module 118A) may generate a record of changes 119 to store the changes 116A. The collaborative editing environment 122A (e.g., source control module 118A) may transmit the changes 116A to the cloud-based environment 101 to be stored in the repository 114 and the cloud-based environment 101 (e.g., source control module 132) may store the changes 116A in a record of changes 119A associated with the client device 110A in the repository 114.

The record of changes 119 may include one or more of an indication of the corresponding copy 109 of committed version 107 of source code 140 (e.g., an indication of the user or client device 110 that corresponds to the changes 116), an indication of changes 116 (e.g., added text, removed text, added lines (carriage returns), removed lines, etc.), etc. For example, record of changes 119A of FIG. 1B may include an indication of the copy 109A of committed version 107 of source code 140 (e.g., indicating the record of changes 119A corresponds to a copy 109A of the committed version 107 of the source code 140 at client device 110A). The record of changes 119A may include an indication of "line 10: add text 'abc'" (e.g., add specific text to a specific line in the copy 109A). The record of changes 119A may include an indication of "line 15: remove text 'def'" (e.g., remove specific text from a specific line in the copy 109A). The record of changes 119A may include an indication of "between line 17 and 18: add new line with text 'ghi'" (e.g., perform a carriage return between two existing lines in copy 109A and add specific text to the new line).

The record of changes 119A may be generated by the client device 110A responsive to receiving changes 116A via the user interface 124A. The record of changes 119A may be generated by the cloud-based environment 101 (e.g., source control module 132) based on the changes 116A received from client device 110A and stored in the repository 114.

In implementations, a particular record of changes 119A is associated with a particular user. The data of record of changes 119A can increase as the user continues to modify a particular part of the source code. A particular user can have one or more associated record of changes. For example, a particular user can have a record of changes for each of the portions (e.g., each function) of source code that the user edits. In another example, a single record of changes can be maintained for a user.

FIGS. 2A-D illustrate examples of collaborative editing of source code 140, in accordance with implementations of the disclosure. In some implementations, FIGS. 2A-D illustrate user interfaces 200 displaying a portion of the copy 109B of the committed version 107 of the source code 140, in accordance with implementations of the disclosure. Elements of FIG. 1 are used in FIG. 2 to help illustrate aspects of the disclosure. For purposes of illustration, rather than limitation, user interfaces 200 are illustrated as user interface 124B of client device 110B displaying a copy 109B of the committed version 107 of source code 140.

As illustrated, a collaborative editing environment 122 is provided by source control platform 120 and displayed via the user interface 124. The cloud-based environment 101 may transmit a copy 109A of a committed version 107 of source code 140 to client device 110A, a copy 109B of a committed version 107 of source code 140 to client device 110B, etc. The copy 109 of the committed version 107 of source code 140 may be displayed via an application (e.g., source control module 118) provided by the collaborative editing environment 122 in a browser window. It can be noted that in other implementations, the collaborative editing environment 122 may be displayed in the user interface 124 of a native application at the client device 110 without using a browser.

The client device 110A may receive user input responsive to a user making changes 116A to (e.g., typing text in) copy 109A of the committed version 107 of source code 140 via the client device 110A. Source control module 118A on the client device 110A may generate a record of changes 119A to store the changes 116A. The client device 110A may transmit the changes 116A to the cloud-based environment 101 to be transmitted to other client devices 110 for real-time collaborative editing of the source code 140 on the source control platform 120. User interfaces 200 of FIGS. 2A-D correspond to a user interface (e.g., user interface 124B) of a client device 110B responsive to client device 110A making changes 116A to the copy 109A to help describe features of the present disclosure. Each copy 109 of the committed version 107 of source code 140 and the changes 116 contain text. Text may refer to any content of the copy 109 of the committed version 107 of source code 140 or changes 116 and may include alpha characters, numeric characters, alphanumeric characters, words, punctuation, spaces, carriage returns (also referred to as a "return" herein), symbols, or any characters represented by American Standard Code for Information Interchange (ASCII) code, and so forth.

As illustrated in FIGS. 2A-D, at least a portion of the copies 109 of the committed version of the source code 140 on the different client devices 110 may include:

function test(param1)
param1=param1+3
end

The client device 110A may receive user input of changes 116A to the copy 109A of the committed version 107 of the source code 140. The changes 116A to the part of the source code 140 may be adding ", param2" to the first line of the part of the source code 140 after "param1," performing a carriage return to add a new line between the second and third line of the part of the source code 140, and adding the text "param2=param1*6" to the new line as follows:

function test(param1, param2)
param1=param1+3
param2=param1*6
end

The client device 110A further receives user input of a selection of a presentation type that specifies access privileges to the changes 116A made via the client device 110A. In some implementations, the presentation type may specify the manner in which changes 116A are displayed on other user's device or the whether or not changes 116A (or the portion of code including changes 116A) can be modified or edited by other users. In some implementations, the specified presentation type affects others users view of the changes 116A.

In some implementations, the client device 110A further receives user input indicative of a publication type that specifies execution privileges of the changes 116A made via the client device 110A. In some implementations, the publication type determines whether changes 116A are propagated to another user's local copy of the committed version. If the changes are propagated to the another user's local copy of the committed version, the local copy of the committed version includes the changes 116A and a committed version with the changes 116A can be compiled or interpreted (e.g., prepare for execution) by the other user. If the changes are not propagated to another user's local copy (pursuant to the selected publication type) the other user's local copy of the committed version does not include changes 116A and the committed version with changes 116A cannot be compiled or interpreted by the other user. The other user still can compile or interpret their local copy with their own changes. It can be noted that even if the other user cannot compile or interpret the local copy of the committed version with changes 116A, the other user still may be able to see changes 116A in a view in the user's device pursuant to the selected presentation type.

The cloud-based environment 101 receives, from the client device 110A, the changes 116A to a part of the source code 140 of the copy 109A of the committed version 107. The cloud-based environment 101 further receives, from the client device 110A, the selection of the presentation type. In some implementations, the cloud-based environment 101 may further receive the selection of the publication type from the client device 110A.

The cloud-based environment 101 may transmit, to each of the other client devices (e.g., client devices 110B-Z), the changes 116A and instructions for real-time presentation of the changes 116A with the corresponding copy 109 (e.g., copy 109B-Z) of the committed version at the corresponding client device 110 in accordance with the selected presentation type. In some implementations, the cloud-based environment 101 may transmit instructions for the execution privileges to each of the other client devices (e.g., client devices 110B-Z) to allow the corresponding client device 110 to propagate the changes 116A to the corresponding copy 109 of the committed version 107 at the client device 110 in accordance with the publication type.

A client device 110B may perform a real-time presentation of the changes 116A with the copy 109B of the committed version 107 of the source code 140 at the client device 110B in accordance with the selected presentation type. In some implementations, the client device 110B may propagate the changes 116B to the second copy 109B to allow the copy 109B including the changes 116A to be prepared for execution (e.g., allow the changes to be propagated and interpreted or compiled) at the client device 110B in accordance with the selected publication type. In some implementations, the client device 110B may be prevented from propagating the changes 116B to the second copy 109B (e.g., to prevent the copy 109B from including the changes 116A for execution at the client device 110B) in accordance with the selected publication type.

In some implementations, the user of client device 110B may scroll to the portion of the source code 140 shown in FIGS. 2A-D. In some implementations, the user of client device 110B may search for and display the portion of the source code 140 shown in FIGS. 2A-D. The user interface 200 may display the portion of the source code 140 and one or more of a visual indication 220 a portion that is being edited, a cursor location of a user that is editing the portion, changes 116, etc.

Figure 2A:
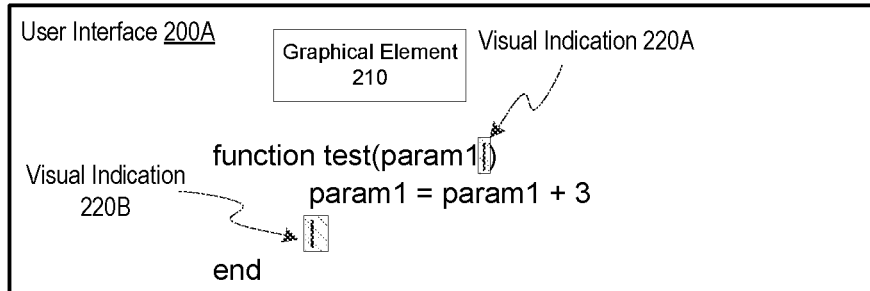
FIGS. 2A-D illustrate examples of collaborative editing of source code, in accordance with implementations of the disclosure

As illustrated in FIG. 2A, the selected presentation type may be a first presentation type that causes client device 110B to display a visual indication 220 (e.g., visual indications 220A-B) that a portion of the source code 140 of the second copy 109B of the committed version 107 that includes the changes 116A without displaying content of the changes 116A. For example, in FIG. 2A, indications 220A-B indicate a portion of the source code 140 is being edited by another client device 110 without displaying the content of the changes 116A. The indication 180 may be a caret, arrow, highlighted portion, or piping indicating the portion of the source code 140 being changed. A visual indication 220 may be at each portion of the source code 140 where another client device 110 is generating changes 116. A visual indication 220 may be at additional portions of the source code 140 that are related to the portions of the source code 140 where another client device 110 is generating changes 116. In some implementations, a graphical element 210 is displayed that is selectable to display the content of the changes 116A. For example, upon user input of selecting the graphical element 210, the client device 110 may display a window (e.g., an overlay window, a pop-up screen, a new user interface etc.) that displays the changes 116A applied to the source code 140.

In some implementations, the client device 110A may receive user input indicating a portion of the copy 109A of the committed version 107 of the source code 140 that the user of client device 110A intends to edit. The client device 110A may transmit an indication of the portion of the copy 109A to the cloud-based environment 101 and the cloud based environment 101 may transmit instructions to the client devices 110B-Z to cause a visual indication 220 that the user of client device 110A intends to edit the portion of the copy 109 of the committed version 107. For example, the instructions may cause the client devices 110B-Z to highlight a portion of their corresponding copies 109B-Z of the committed version 107 indicating that the user of client device 110A intends to edit that portion of the source code 140.

Figure 2B:
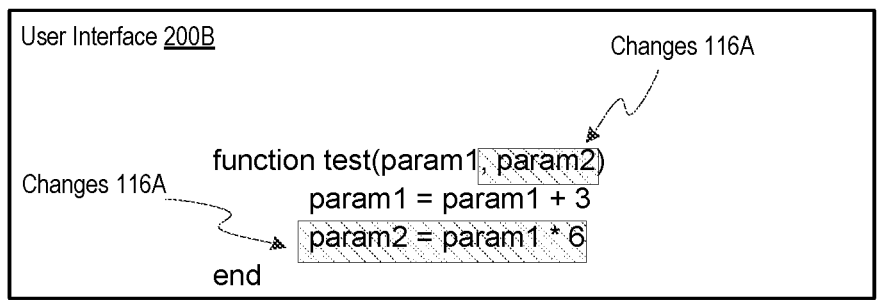

As illustrated in FIG. 2B, the selected presentation type may be a second presentation type that causes client device 110B to display (e.g., via user interface 200B) content of the changes 116A in a portion of the copy 109B of the committed version 107 in real-time and prohibits a user of the client device 110B from editing the portion of the copy 109B of the committed version 107 that includes the changes 116A. The user of the client device 110B may be allowed to edit the copy 109B of the committed version 107 without editing the changes 116A. The second presentation type may prohibit the user of the client device 110B from making changes 116B on top of the changes 116A (e.g., the client device 110B may display the changes 116A and may prohibit editing or otherwise interacting with the changes 116A). In some implementations, the user interface 200B may illustrate the changes 116A in a different font color. In some implementations, the user interface 200B may display a visual indication (e.g., highlighting, carets, arrows, piping, etc.) indicating the text of the changes 116A.

Figure 2C:
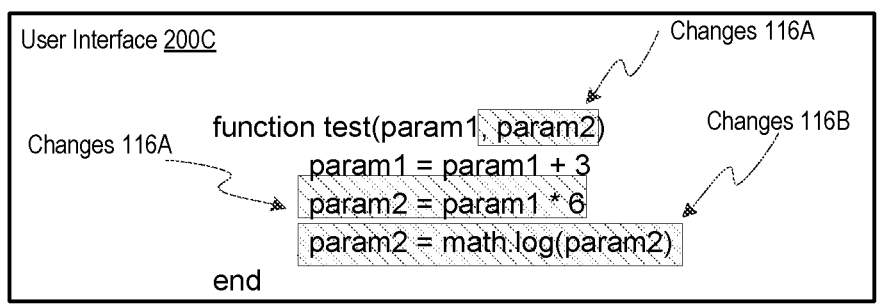

As illustrated in FIG. 2C, the selected presentation type may be a third presentation type that causes client device 110B to display (e.g., via user interface 200C) content of the changes 116A in a portion of the copy 109B of the committed version 107 in real-time and allows a user of the client device 110B to edit the portion of the copy 109B of the committed version 107 that includes the changes 116A. As illustrated in FIG. 2C, the client device 110B may receive user input of changes 116B, such as "param2=math·log (param2)" that are displayed in conjunction with the part of the source code 140 and the changes 116A. In some implementations, client device 110B is to wait to commit changes 116B to the portion of the copy 109B until the client device 110A commits the changes 116A (e.g., first changes in a general area are to be committed before other changes are to be committed, the user that generates changes 116A first is to specify whether a user that generates later changes 116B can commit the later changes 116B prior to the user committing the first changes 116A). In some implementations, client device 110B may commit changes 116B before the client device 110 commits the changes 116A In some implementations, the user interface 200B may illustrate the changes 116A in a first font color, the changes 116B in a second font color, and the part of the source code 140 in a third font color. In some implementations, the user interface 200B may display a first visual indication (e.g., highlighting, carets, arrows, piping, etc.) indicating the text of the changes 116A and a second visual indication indicating the text of the changes 116B. The third presentation type may allow the user of the client device 110B to make changes 116B on top of the changes 116A (e.g., the client device 110B may display the changes 116A and may edit or otherwise interact with the changes 116A).

The cloud-based environment 101 may receive, from the client device 110A, a commit request that identifies at least some source code changes in the first record of changes 119A and requests that the identified changes of the record of changes 119A be committed to the committed version 107 of the source code 140 stored at a repository 114 of the source control platform 120. Responsive to receiving the commit request, the cloud-based environment 101 may commit the identified changes of the record of changes 119A to the committed version 107 of the source code 140 stored at the repository 114 to generate a new committed version of the source code 140. The cloud-based environment 101 may transmit a corresponding copy of the new committed version of the source code to each of the client devices 110 for the real-time collaborative editing of the source code 140.

Figure 2D:
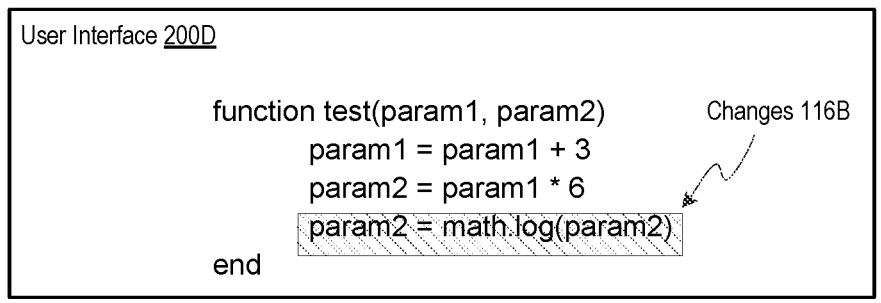

As illustrated in FIG. 2D, the commit request may correspond to the changes 116A of adding ", param2" to the first line of the part of the source code 140 after "param1," performing a carriage return to add a new line between the second and third line of the part of the source code 140, and adding the text "param2=param1*6" to the new line. The cloud-based environment 101 may commit these changes 116A to the committed version 107 of the source code 140 to generate a new committed version of the source code 140 that includes the changes 116A. As illustrated in FIG. 2D, the changes 116A are no longer shown as a visual indication 220A or changes 116A. The changes 116A are shown as part of the committed version 107 of the source code 140. The client device 110B may be prohibited from committing changes 116B on top of the changes 116A (e.g., changes 116B dependent upon the changes 116A) until the changes 116A are committed. As illustrated in FIG. 2D, now that the changes 116A are committed, the changes 116B may be committed.

In implementations, the cloud-based environment 101 receives the changes 116A and determines a location of additional source code that is related to the changes 116A in the part of the source code of the copy 109A of the committed version 107. A portion of the source code includes the part of the source code 140 receiving the changes 116A and the additional source code. The instructions for the real-time presentation of the changes 116A with a copy 109 of the committed version 107 at another client device 110 identify the portion of the source code. In some implementations, the portion of the source code 140 may include consecutive text. For example, a portion of the source code 140 may be a text region that includes text of part of a line, a single line, or multiple consecutive lines (e.g., N number of lines) of copy 109 of the committed version 107 of source code 140. In some implementations, the portion of the source code may include related functions. For example, the text "function test(param1" . . . "end" may be part of the same function and the instructions for real-time presentation of the changes 116A may identify the entire function. In another example, "function test (param1 . . . " may be functionally related to additional text elsewhere in the source code and the instructions for real-time presentation of the changes 116A may identify "function test(param1 . . . " and the additional text elsewhere in the source code.

In some implementations, a client device 110A may receive user input of a region of the copy 109A that the user of client device 110A intends to edit. The region may include a portion of a source code file or portions of multiple source code files. One or more of user interfaces 200A-D may illustrate a visual indication 220 indicating the region of the copy 109A that the user of client device 110A intends to edit in addition to a visual indication 220 of changes 116A or the content of changes 116A. By receiving one or more of indications of regions that users intend to edit, indications of where users are editing, or the changes 116 of users, a user may avoid making edits to those regions or may make edits that are compatible with the other changes. In so doing, conflicts may be avoided and decreased processor overhead, required bandwidth, and energy consumption may be required for synchronizing changes and merging conflicts. By avoiding conflicts, functionality of the source code 140 may also be increased.

Figure 3A:
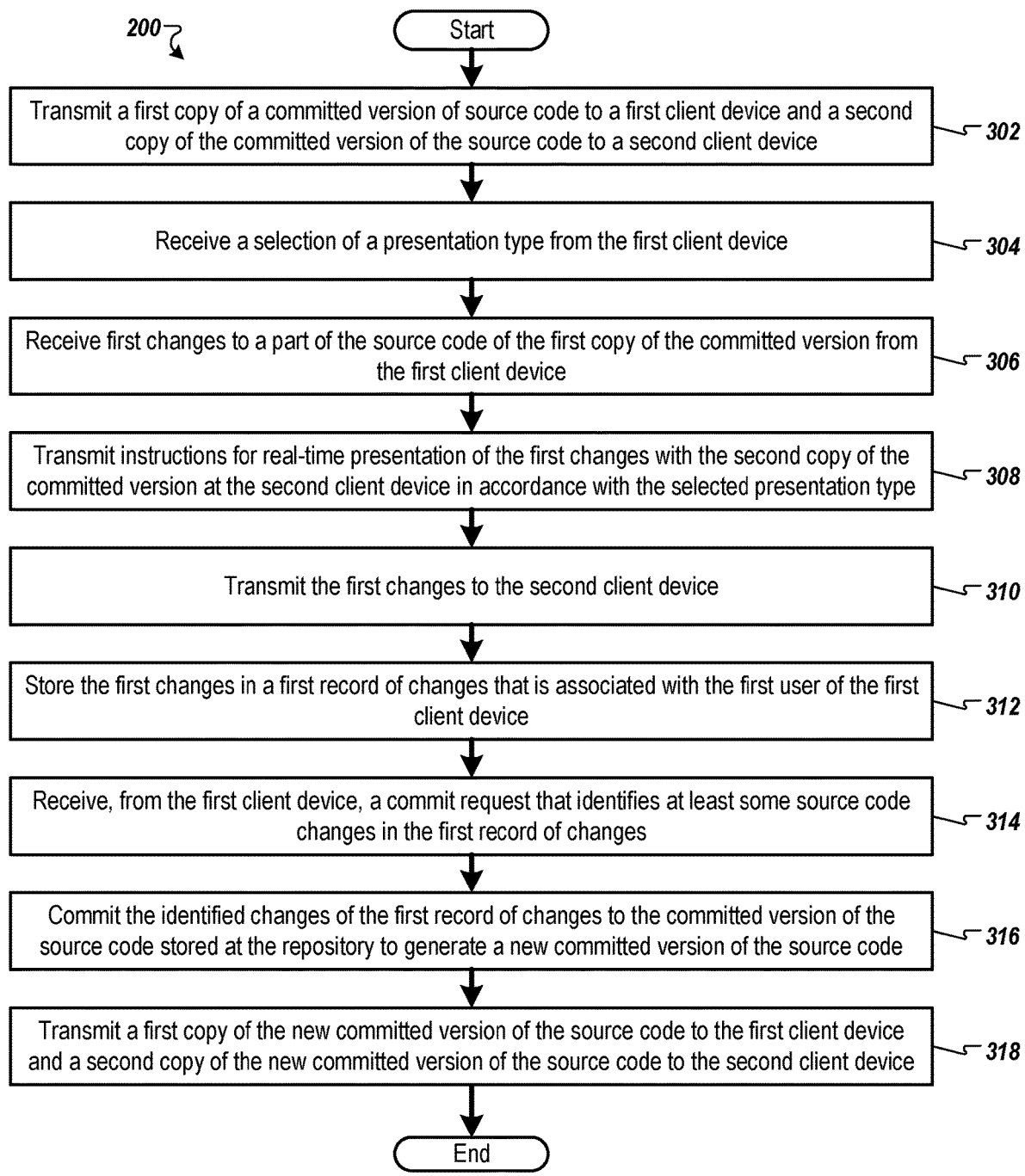
FIGS. 3A-B are flow diagrams illustrating methods of providing real-time collaborative editing of source code, in accordance with implementations of the disclosure.
Figure 3B:
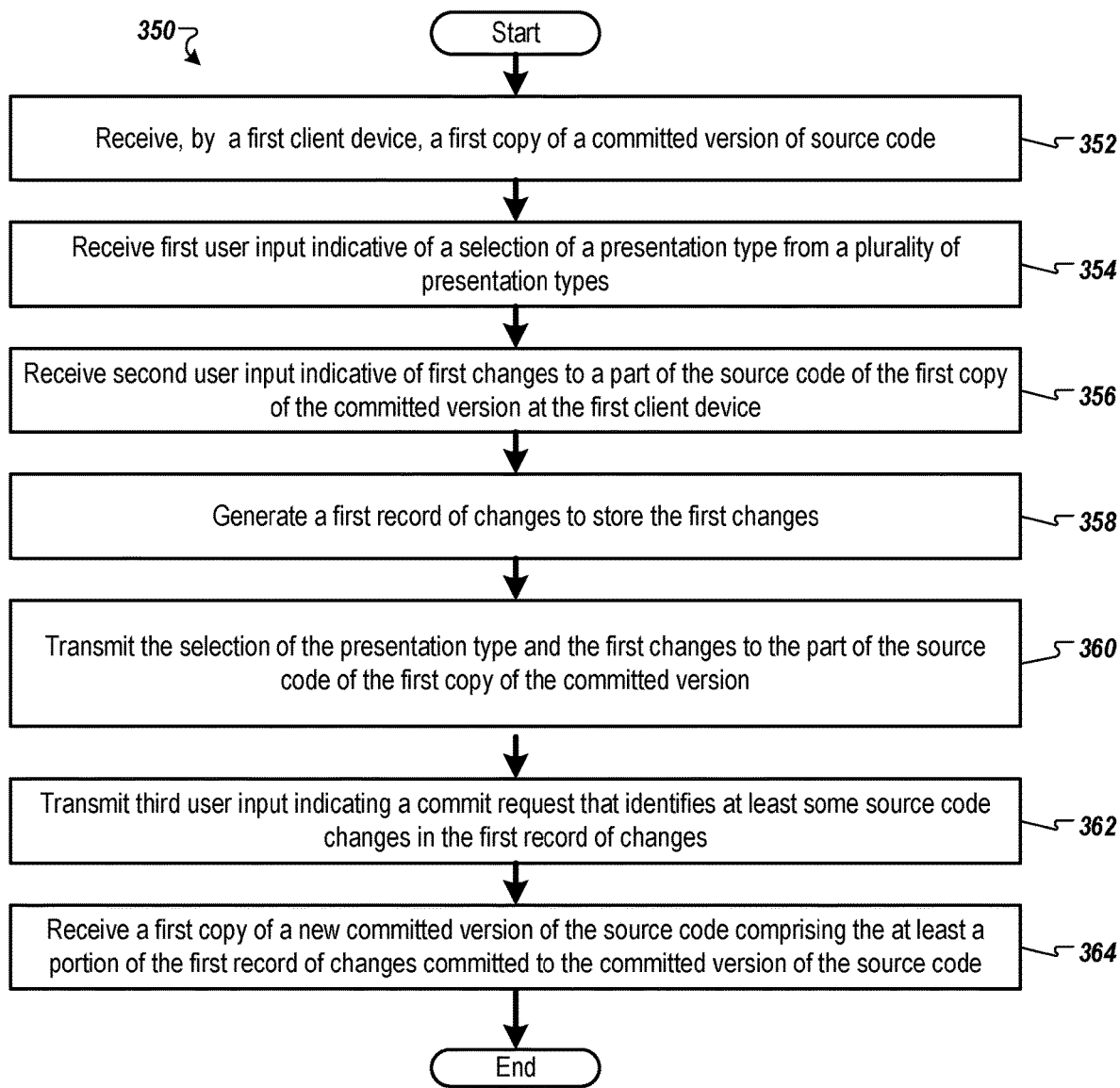

FIGS. 3A-B are flow diagrams illustrating methods 300 and 350 of providing real-time collaborative editing of source code 140, in accordance with implementations of the disclosure. Methods 300 and 350 may be performed by processing logic that includes hardware (e.g., circuitry, dedicated logic, programmable logic, microcode), software (e.g., instructions run on a processing device to perform hardware simulation), or a combination thereof. In some implementations, source control module 118 executing at client device 110 may perform some or all the operations of method 350. In other implementations, source control module 132 executing at source control platform 120 may perform some or all the operations of method 300. Elements of FIGS. 1A-B and 2A-D may be used to help illustrate method 300 and 350. It may be noted that the in some implementations, methods 300 and 350 may include the same, different, fewer, or a greater number of operations performed in any order.

FIG. 3A is a flow diagram illustrating method 300 of providing real-time collaborative editing of source code, in accordance with implementations of the disclosure. Method 300 may be performed by source control module 132.

At block 302, processing logic (e.g., of the cloud-based environment 101, of source control platform 120) executing method 300 transmits a copy 109A of a committed version 107 of source code 140 to a client device 110A, a copy 109B of the committed version 107 of the source code 140 to a client device 110B for real-time collaborative editing of the source code 140 on a source control platform 120, etc. In some implementations, the processing logic may transmit a copy 109 to each client device 110 that has been authorized to collaboratively edit the source code 140. In some implementations, the processing logic may transmit a copy 109 to each client device 110 that has been authorized and has requested to collaboratively edit the source code 140.

At block 304, the processing logic receives, from client device 110A, a selection of a presentation type. The presentation type may selected from a plurality of presentation types that specify (for one or more other users of the source control platform 120) access privileges to changes 116A made by a first user associated with the client device 110A to the copy 109A of the committed version 107 of the source code 140.

In some implementations, the processing logic receives, from the client device 110A, a selection of a publication type. The publication type may be selected from a plurality of publication types that specify (for the one or more other users of the source control platform 120) execution privileges to the changes 116A made by the first user to the copy 109A of the committed version 107 of the source code 140.

In some implementations, the processing logic receives, from client device 110A, a selection of a publication type selected from a plurality of presentation types that specify (for one or more other users of the source control platform 120) execution privileges to changes 116A made by a first user associated with the client device 110A to the copy 109A of the committed version 107 of the source code 140.

At block 306, the processing logic receives, from the client device 110A, changes 116A to a part of the source code 140 of the copy 109A of the committed version 107.

At block 308, the processing logic transmits instructions for real-time presentation of the changes 116A with the copy 109B of the committed version 107 at the client device 110B in accordance with the selected presentation type. The instructions may identify a start line and a stop line of source code 140 that is affected by the presentation type.

In some implementations, the presentation type is a first presentation type. The transmitting of the instructions in accordance with the first presentation type causes the client device 110B to display a visual indication 220 of a portion of the source code 140 of the copy 109B of the committed version 107 that includes the changes 116A without displaying content of the changes 116A (see FIG. 2A). In some implementations, transmitting of the instructions in accordance with the first presentation type further causes the client device 110B to display a graphical element 210 that is selectable to display the content of the changes 116A.

In some implementations, the presentation type is a second presentation type. The transmitting of the instructions in accordance with the second presentation type causes the client device 110B to display content of the changes 116A in a portion of the copy 109B of the committed version 107 in real-time and prohibits a second user of the client device 110B from editing the portion of the copy 109B of the committed version 107 that includes the changes 116A (see FIG. 2B).

In some implementations, the presentation type is a third presentation type. The transmitting of the instructions in accordance with the third presentation type causes the client device 110B to display content of the changes 116A in real-time and to allow a second user of the client device 110B to edit a portion of the copy 109B of the committed version 107 that includes the changes 116A (see FIG. 2C).

In some implementations, the transmitting of the instructions in accordance with a presentation type causes the client device 110B to display a visual indication 220 that indicates more than the changes 116A. The visual indication 220 may indicate the changes 116A and additional source code that is related to the changes 116A. For example, responsive to making changes 116A to part of a function, a visual indication 220 may indicate the entire function of the source code 140 (e.g., the part of the source code 140 of the copy 109A of the committed version 107 includes some source code of a function and the additional source code includes remaining source code of the function). In another example, responsive to making changes to part of a statement, a visual indication 220 may indicate the compound statement including branching statements. In some implementations, the additional source code may be adjacent source code block to the part of the source code 140 receiving the changes 116A. In some implementations, the additional source code is not adjacent to the part of the source code 140 receiving the changes 116A.

In some implementations, the client device 110A indicates the portion of source code 140 that includes the part of the source code 140 receiving or that is to receive the changes 116A and the additional source code. In some implementations, processing logic (e.g., of the cloud-based environment 101) may determine a location of additional source code that is related to the changes 116A (or intended changes 116A) in the part of the source code 140 of the copy 109A of the committed version 107. The processing logic may determine the portion of the source code 140 that includes the part of the source code 140 receiving the changes 116A and the additional source code.

In some implementations, at block 308, the instructions are further in accordance with the selected publication type. In some implementations, the processing logic transmits first instructions in accordance with the selected presentation type and second instructions in accordance with the selected publication type. In some implementations, responsive to receiving the selection of a first publication type, the processing logic may transmit first instructions for the execution privileges to the client device 110B that cause the client device 110B to propagate the changes 116A to the copy 109B of the committed version 107 at the client device 110B in accordance with the first publication type to allow the copy 109B of the committed version 107 including the changes 116A to be prepared for execution (e.g., interpreted, compiled, translated, assembled, etc.) at the client device 110B.

Source code 140 may be a text version of program instructions that are written in a programming language (e.g., a high level language) that a user can read and change. Source code may be prepared for execution by translating (e.g., compiling, interpreting) the code into language (e.g., assembly language, machine language) that is faster and easier for a computer to read. In some implementations, preparing the source code 140 for execution includes interpreting the source code 140. For example, an interpreter may read and then execute each command in the source code 140. In another example, an interpreter may analyze the entire source code before sending corresponding machine language instructions. In some implementations, preparing the source code 140 for execution includes compiling the source code 140. For example, a compiler may produce a program written in an assembly language and an assembler may turn the resulting program into machine code (e.g., binary code) that the computer understands.

Propagation of changes 116A to a copy 109B of a committed version 107 at a client device 110B may be responsive to a request by the user of client device 110B to propagate the changes 116A (e.g., the changes 116A may not propagate to the copy 109B without a user request or user approval of the user of client device 110B).

In some implementations, allowing the source code 140 to be prepared for execution is interpreting the source code 140 including the changes 116A at the client device 110B. In some implementations, allowing the source code 140 to be prepared for execution is compiling the source code 140 including the changes 116A at the client device 110B.

In some implementations, responsive to receiving the selection of a second publication type, the processing logic may transmit second instructions for the execution privileges to the client device 110B that prevent the client device 110B from propagating the changes 116A to the copy 109B of the committed version 107 at the client device 110B in accordance with the second publication type (e.g., the changes 116A are prevented from propagating to the copy 109B to prevent the changes 116A from being prepared for execution with the copy 109B of the committed version 107 at the client device 110B).

In some implementations, responsive to receiving the selection of a presentation type and the selection of a publication type, the processing logic may transmit an instruction to cause the client device 110B to act in accordance with the presentation type and the publication type. For example, an instruction may cause the client device 110B to display the changes 116A, allow the user of the client device 110B to edit the portion of the copy 109B that includes the changes 116A, and prevent the client device 110B from propagating the changes 116A from being prepared for execution (e.g., prevent from compiling or interpreting). In another example, an instruction may cause the client device 110B to display the changes 116A, prevent the user of the client device 110B from editing the portion of the copy 109B that includes the changes 116A, and allow the client device 110B to propagate the changes 116A to be prepared for execution (e.g., allow the changes 116A to be propagated to the copy 109B for compiling or interpreting).

A user may specify any combination of access privileges and execution privileges of other users for the changes 116 made by the user. A user may specify different combinations of access privileges and execution privileges for different groups of users.

Returning to FIG. 3A, at block 310, the processing logic transmits the changes 116A to the client device 110B. The processing logic may continuously receive the changes 116A in real-time and may transmit the changes 116A to the other client devices 110 in real-time.

At block 312, the processing logic stores the changes 116A in a record of changes 119A (see FIG. 1B) that is associated with the first user of the client device 110A. The record of changes 119A may change overtime as new changes 116A are received.

At block 314, the processing logic receives, from the client device 110A, a commit request that identifies at least some source code changes (e.g., at least a subset of changes 116A) in the record of changes 119A and requests that the identified changes of the record of changes 119A be committed to the committed version 107 of the source code 140 stored at a repository 114 of the source control platform 120.

At block 316, responsive to receiving the commit request, the processing logic commits the identified changes of the record of changes 119A to the committed version 107 of the source code 140 stored at the repository 114 to generate a new committed version of the source code 140.

At block 318, the processing logic transmits a first copy of the new committed version of the source code 140 to the client device 110A and a second copy of the new committed version of the source code 140 to the client device 110B for the real-time collaborative editing of the source code 140 (see FIG. 2D).

As discussed above, users are able to track each other's work in real time. The number and magnitude of the merge conflicts may be minimized by keeping users aware of each other's work in real time. Users may one or more of have a sneak peek at the changes made by other users in real time, take the changes into their copy 109 of the committed version of the source code 140, base their changes on the changes by others, etc. to avoid conflicts.

FIG. 3B is a flow diagram illustrating method 350 of providing real-time collaborative editing of source code, in accordance with implementations of the disclosure. Method 350 may be performed by source control module 118 of client device 110.

At block 352, processing logic performing method 350 receives, from a server device (e.g., cloud-based environment 101 source control platform 120), a copy 109A of a committed version 107 of source code 140 for real-time collaborative editing of the source code 140 on a source control platform 120.

At block 354, processing logic receives first user input (e.g., via user interface 124A) indicative of a selection of a presentation type. The presentation type may be selected from a plurality of presentation types that specify (for one or more other users of the source control platform 120) access privileges to changes 116A made by a first user associated with the client device 110A to the copy 109A of the committed version 107 of the source code 140. In some implementations, the processing logic receives user input (e.g., via user interface) indicative of a selection of a publication type that specifies execution privileges to changes 116A.

At block 356, processing logic receives second user input indicative of changes 116A to a part of the source code 140 of the copy 109A of the committed version 107 at the client device 110A. The changes 116A may include one or more of addition of text, removal of text, carriage returns to add lines, removal of liens, etc.

At block 358, processing logic generates a first record of changes 119A to store the changes 116A at the client device 110A. The first record of changes 119A may change overtime as new changes 116A are received.

At block 360, processing logic transmits, to the server device, the selection of the presentation type and the changes 116A to the part of the source code 140 of the copy 109A of the committed version 107. The changes 116A are to be recorded by the server device in a second record of changes 119A that corresponds to the first record of changes 119A at the client device 110A.

In some implementations, the presentation type is a first presentation type. The transmitting of the selection of the presentation type causes a client device 110B to display a visual indication 220 of a portion of the source code 140 of the copy 109B of the committed version 107 that includes the changes 116A without displaying content of the changes 116A (see FIG. 2A). In some implementations, transmitting of the selection of the presentation type further causes the client device 110B to display a graphical element 210 that is selectable to display the content of the changes 116A.

In some implementations, the presentation type is a second presentation type. The transmitting of the selection of the presentation type causes the client device 110B to display content of the changes 116A in a portion of the copy 109B of the committed version 107 in real-time and prohibits a second user of the client device 110B from editing the portion of the copy 109B of the committed version 107 that includes the changes 116A (see FIG. 2B).

In some implementations, the presentation type is a third presentation type. The transmitting of the selection of the presentation type causes the client device 110B to display content of the changes 116A in real-time and to allow a second user of the client device 110B to edit a portion of the copy 109B of the committed version 107 that includes the changes 116A (see FIG. 2B).

In some implementations, processing logic may determine a location of additional source code that is related to the changes 116A in the part of the source code 140 of the copy 109A of the committed version 107. A portion of the source code 140 includes the part of the source code 140 receiving the changes 116A and the additional source code. The transmitting of the selection of the presentation type and the changes 116A identifies the portion of the source code 140.

At block 362, processing logic transmits, to the server device, third user input indicating a commit request that identifies at least some source code changes in the first record of changes 119A and requests that the identified changes of the first record of changes 119A be committed to the committed version 107 of the source code 140 stored at a repository 114 of the source control platform 120.

At block 364, processing logic receives, from the server device, a first copy of a new committed version of the source code 140 including the at least a portion of the first record of changes 119A committed to the committed version 107 of the source code 140 using the second record of changes 119A (e.g., stored in the repository 114).

Figure 4:
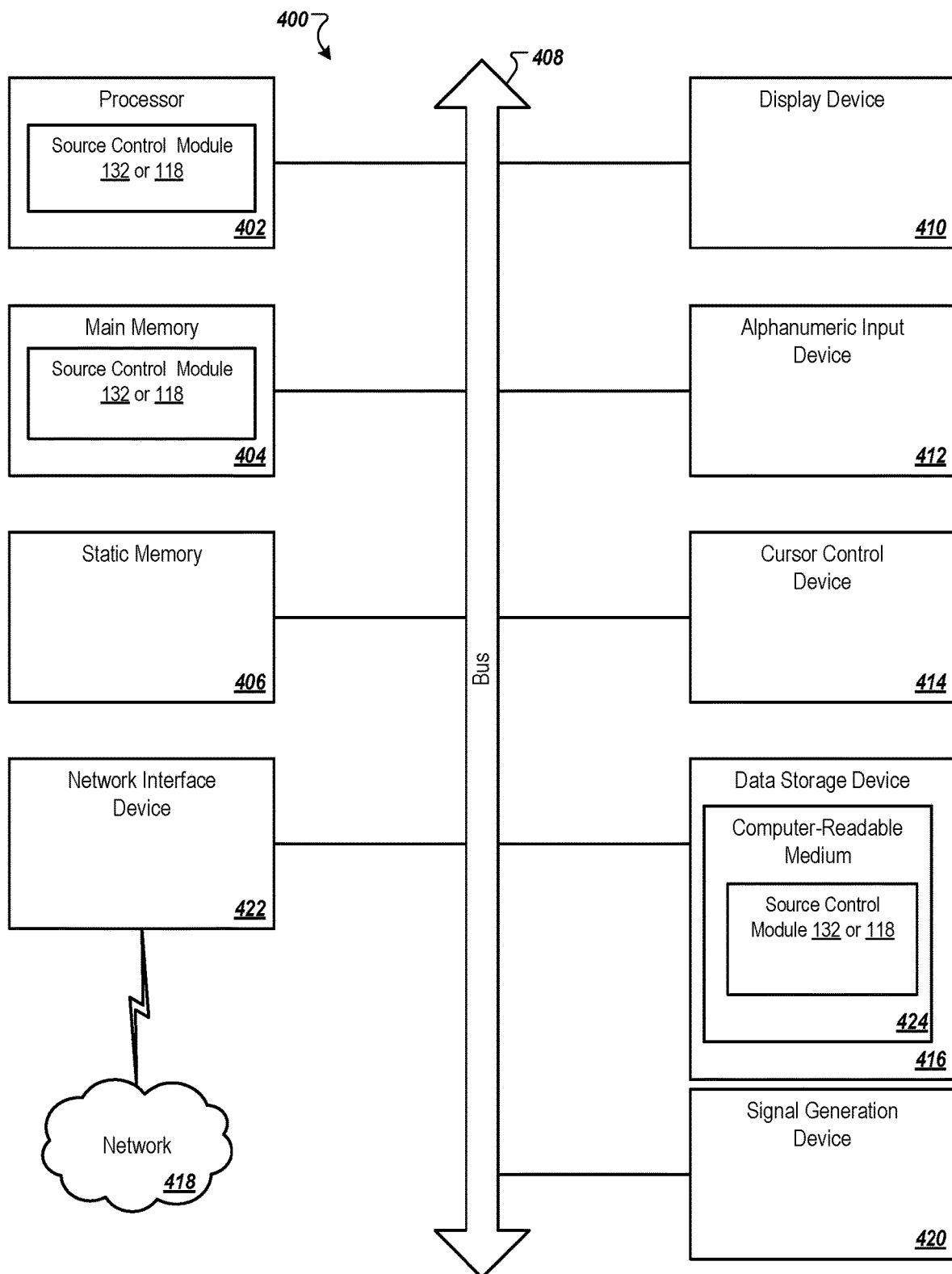
FIG. 4 is a block diagram illustrating an exemplary computer system, in accordance with implementations of the disclosure.

FIG. 4 depicts a block diagram of an example computing system operating in accordance with one or more aspects of the present disclosure. In various illustrative examples, computer system 400 may correspond to any of the computing devices within system architecture 100 of FIG. 1. In one implementation, the computer system 400 may be the source control platform 120. In another implementation, the computer system 400 may be each of the client devices 110A-110Z.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a computer-readable storage medium 424 (which may be a non-transitory computer-readable storage medium, although the disclosure is not limited to this) which may store instructions 426 encoding any one or more of the methods or functions described herein, including instructions implementing the source control module 132 or 118 (118A-118Z) of FIG. 1 for implementing any of the methods described herein.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting," "receiving," "storing," "committing," "determining," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it can be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not necessarily intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure can, therefore, be determined with reference to the appended claims, along with the full scope of equivalents to which such claims are entitled.

What is claimed is:

1. A method comprising:
   providing, to a first client device, a presentation of a first instance of source code;
   receiving first source code changes to the first instance of the source code performed by the first client device associated with a first user account;
   receiving, by a server device from the first client device, a selection of a first presentation type from a plurality of presentation types comprising the first presentation type and a second presentation type prior to the first source code changes being committed to the source code stored at a repository of a source control platform, wherein the first presentation type specifies first access privileges to the first source code changes for at least a second user account, wherein the second presentation type specifies second access privileges to the first source code changes for the at least the second user account, wherein the second access privileges are different from the first access privileges of the first presentation type; and
   providing, to a second client device associated with the second user account, a presentation of a second instance of the source code with the first source code changes in accordance with the first presentation type prior to the first source code changes being committed to the source code stored at the repository of the source control platform.

2. The method of claim 1, wherein the presentation of the first instance of the source code to the first client device and the presentation of the second instance of the source code to the second client device are provided in a real-time collaborative editing environment for real-time collaborative editing of the source code.

3. The method of claim 1 further comprising:
   receiving, from the first client device, the first source code changes to the first instance of the source code;
   wherein providing the presentation of the second instance of the source code with the first source code changes comprises providing, to the second client device, one or more commands for real-time presentation of the first source code changes with the second instance of the source code.

4. The method of claim 1, further comprising:
   storing the first source code changes in a first record of changes that is associated with the first user account;
   receiving, from the first client device, a commit request that identifies at least a portion of source code changes in the first record of changes and indicates that the identified portion of the source code changes of the first record of changes be committed to the source code stored at the repository of the source control platform;
   responsive to receiving the commit request, committing the identified portion of the source code changes of the first record of changes to the source code stored at the repository to obtain new source code; and
   transmitting a first copy of the new source code to the first client device and a second copy of the new source code to the second client device.

5. The method of claim 1, further comprising:
   receiving, from the first client device, a selection of a first publication type from a plurality of publication types comprising the first publication type and a second publication type, wherein the first publication type specifies first execution privileges to the first source code changes performed by the first client device associated with the first user account to the first instance of the source code, wherein the second publication type specifies second execution privileges that are different from the first execution privileges of the first publication type; and
   transmitting one or more commands corresponding to the first execution privileges to the second client device, wherein the first execution privileges are associated with propagation of the first source code changes to the second instance of the source code and allow the second instance of the source code comprising the first source code changes to be prepared for execution at the second client device.

6. The method of claim 1, wherein providing, to the second client device, the presentation of the second instance of the source code with the first source code changes in accordance with the first presentation type causes the second client device to display a visual indication of a portion of the source code of the second instance of the source code that includes the first source code changes without displaying content of the first source code changes.

7. The method of claim 1, wherein providing, to the second client device, the presentation of the second instance of the source code with the first source code changes in accordance with the first presentation type causes the second client device to display content of the first source code changes in the second instance of the source code and prohibits the second user account from editing a portion of the second instance of the source code that includes the first source code changes.

8. The method of claim 1, wherein providing, to the second client device, the presentation of the second instance of the source code with the first source code changes in accordance with the first presentation type causes the second client device to display content of the first source code changes in real-time and allows the second user account to edit a portion of the second instance of the source code that includes the first source code changes.

9. The method of claim 1, further comprising:
determining additional source code that is related to the first source code changes, wherein a portion of the source code comprises the first source code changes and the additional source code, wherein the providing of the presentation of the second instance of the source code with the first source code changes identifies the portion of the source code.

10. A method comprising:
receiving, by a first client device from a server device, a presentation of a first instance of source code;
identifying first source code changes to the first instance of the source code performed by the first client device associated with a first user account;
receiving first user input indicative of a selection of a first presentation type from a plurality of presentation types comprising the first presentation type and a second presentation type prior to the first source code changes being committed to the source code stored at a repository of a source control platform, wherein the first presentation type specifies first access privileges to the first source code changes for at least a second user account, wherein the second presentation type specifies second access privileges to the first source code changes for the at least the second user account, wherein the second access privileges are different from the first access privileges of the first presentation type; and
transmitting, to the server device associated with the second user account, the selection of the first presentation type and the first source code changes to the first instance of the source code, wherein a presentation of a second instance of the source code with the first source code changes is to be provided to a second client device in accordance with the first presentation type prior to the first source code changes being committed to the source code stored at the repository of the source control platform.

11. The method of claim 10, wherein the presentation of the first instance of the source code provided to the first client device in a real-time collaborative editing environment for real-time collaborative editing of the source code with the second client device.

12. The method of claim 10 further comprising:
generating, at the first client device a first record of changes indicative of the first source code changes, wherein the first source code changes are recorded by the server device in a second record of changes that corresponds to the first record of changes at the first client device;
transmitting, to the server device, second user input indicating a commit request that identifies at least a portion of source code changes in the first record of changes and indicates that the identified portion of the source code changes of the first record of changes be committed to the source code stored at the repository of the source control platform; and
receiving, by the first client device from the server device, a first copy of new code comprising the at least a portion of the first record of changes committed to the source code using the second record of changes.

13. The method of claim 10, wherein transmitting, to the server device, the selection of the first presentation type and the first source code changes to the first instance of the source code causes the second client device to display one or more of:
a visual indication of a portion of the source code of the second instance of the source code that includes the first source code changes without displaying content of the first source code changes;
a graphical element that is selectable to display the content of the first source code changes; or
the content of the first source code changes in the second instance of the source code while prohibiting the second user account from editing the portion of the second instance of the source code that includes the first source code changes or while allowing the second user account to edit the portion of the second instance of the source code that includes the first source code changes.

14. The method of claim 10, further comprising:
determining additional source code that is related to the first source code changes, wherein a portion of the source code comprises the first source code changes and the additional source code, wherein the transmitting of the selection of the first presentation type and the first source code changes identifies the portion of the source code.

15. A non-transitory computer-readable storage medium storing instructions that, responsive to execution by a processing device, cause the processing device to perform operations comprising:
providing, to a first client device, a presentation of a first instance of source code/
receiving first source code changes to the first instance of the source code performed by the first client device associated with a first user account;
receiving, from the first client device, a selection of a first presentation type from a plurality of presentation types comprising the first presentation type and a second presentation type prior to the first source code changes being committed to the source code stored at a repository of a source control platform, wherein the first presentation type specifies first access privileges to the first source code changes for at least a second user account, wherein the second presentation type specifies second access privileges to the first source code changes for the at least the second user account, wherein the second access privileges are different from the first access privileges of the first presentation type; and
providing, to a second client device associated with the second user account, a presentation of a second instance of the source code with the first source code changes in accordance with the first presentation type prior to the first source code changes being committed to the source code stored at the repository of the source control platform.

16. The non-transitory computer-readable storage medium of claim 15, wherein the presentation of the first instance of the source code to the first client device and the presentation of the second instance of the source code to the second client device are provided in a real-time collaborative editing environment for real-time collaborative editing of the source code.

17. The non-transitory computer-readable storage medium of claim 15, wherein the operations further comprise:
  receiving, from the first client device, the first source code changes to the first instance of the source code;
  wherein providing the presentation of the second instance of the source code with the first source code changes comprises providing, to the second client device, one or more commands for real-time presentation of the first source code changes with the second instance of the source code.

18. The non-transitory computer-readable storage medium of claim 15, wherein the operations further comprise:
  storing the first source code changes in a first record of changes that is associated with the first user account;
  receiving, from the first client device, a commit request that identifies at least a portion of source code changes in the first record of changes and indicates that the identified portion of the source code changes of the first record of changes be committed to the source code stored at the repository of the source control platform;
  responsive to receiving the commit request, committing the identified portion of the first record of changes to the source code stored at the repository to obtain new source code; and
  transmitting a first copy of the new source code to the first client device and a second copy of the new source code to the second client device.

19. The non-transitory computer-readable storage medium of claim 15, wherein the operations further comprise:
  receiving, from the first client device, a selection of a first publication type from a plurality of publication types comprising the first publication type and a second publication type, wherein the first publication type specifies first execution privileges to the first source code changes made performed by the first client device associated with the first user account to the first instance of the source code, wherein the second publication type specifies second execution privileges that are different from the first execution privileges of the first publication type; and
  transmitting one or more commands corresponding to the first execution privileges to the second client device, wherein the first execution privileges are associated with propagation of the first source code changes to the second instance of the source code and allowing the second instance of the source code comprising the first source code changes to be prepared for execution at the second client device.

20. The non-transitory computer-readable storage medium of claim 15, wherein providing, to the second client device, the presentation of the second instance of the source code with the first source code changes in accordance with the first presentation type causes the second client device to display one or more of:
  a visual indication of a portion of the source code of the second instance of the source code that includes the first source code changes without displaying content of the first source code changes;
  a graphical element that is selectable to display the content of the first source code changes; or
  the content of the first source code changes in the second instance of the source code while prohibiting the second user account from editing the portion of the second instance of the source code that includes the first source code changes or while allowing the second user account to edit the portion of the second instance of the source code that includes the first source code changes.

* * * * *